United States Patent
Licht

(10) Patent No.: US 11,542,609 B2
(45) Date of Patent: Jan. 3, 2023

(54) METHODS AND SYSTEMS FOR PRODUCTION OF DOPED CARBON NANOMATERIALS

(71) Applicant: C2CNT LLC, Venice, FL (US)

(72) Inventor: Stuart Licht, Venice, FL (US)

(73) Assignee: C2CNT LLC, Venice, FL (US)

( * ) Notice: Subject to any disclaimer, the term of this patent is extended or adjusted under 35 U.S.C. 154(b) by 403 days.

(21) Appl. No.: 16/484,329

(22) PCT Filed: Feb. 21, 2018

(86) PCT No.: PCT/US2018/019035
§ 371 (c)(1),
(2) Date: Aug. 7, 2019

(87) PCT Pub. No.: WO2018/156642
PCT Pub. Date: Aug. 30, 2018

(65) Prior Publication Data
US 2020/0032404 A1    Jan. 30, 2020

Related U.S. Application Data

(60) Provisional application No. 62/461,641, filed on Feb. 21, 2017.

(51) Int. Cl.
*C01B 32/15*    (2017.01)
*C01B 32/184*    (2017.01)
(Continued)

(52) U.S. Cl.
CPC ............... *C25B 1/00* (2013.01); *C01B 32/15* (2017.08); *C01B 32/16* (2017.08); *C01B 32/18* (2017.08);
(Continued)

(58) Field of Classification Search
CPC .. C25B 1/00; C25B 9/17; C25B 15/02; C01B 32/15; C01B 32/16; C01B 32/18; C01B 32/184; B82Y 40/00
See application file for complete search history.

(56) References Cited

U.S. PATENT DOCUMENTS

2010/0219383 A1* 9/2010 Eklund ............... B82Y 30/00
                                                                            252/516
2014/0202874 A1   7/2014 Elgammal et al.

FOREIGN PATENT DOCUMENTS

CN    104674289 A  *  6/2015
CN    105506665 A  *  4/2016
(Continued)

OTHER PUBLICATIONS

Dipu, Arnoldus Lambertus, et al. "Electrolysis of carbon dioxide for carbon monoxide production in a tubular solid oxide electrolysis cell." Annals of Nuclear Energy 81 (2015): 257-262.*
(Continued)

*Primary Examiner* — Richard M Rump
(74) *Attorney, Agent, or Firm* — Blank Rome LLP

(57) ABSTRACT

A system and process for producing doped carbon nanomaterials is disclosed. A carbonate electrolyte including a doping component is provided during the electrolysis between an anode and a cathode immersed in carbonate electrolyte contained in a cell. The carbonate electrolyte is heated to a molten state. An electrical current is applied to the anode, and cathode, to the molten carbonate electrolyte disposed between the anode and cathode. A morphology element maximizes carbon nanotubes, versus graphene versus carbon nano-onion versus hollow carbon nano-sphere nanomaterial product. The resulting carbon nanomaterial growth is collected from the cathode of the cell.

21 Claims, 10 Drawing Sheets

(51) Int. Cl.
*C01B 32/16* (2017.01)
*C25B 1/00* (2021.01)
*C01B 32/18* (2017.01)
*C25B 15/02* (2021.01)
*C25B 9/17* (2021.01)

(52) U.S. Cl.
CPC .............. *C01B 32/184* (2017.08); *C25B 9/17* (2021.01); *C25B 15/02* (2013.01)

(56) References Cited

FOREIGN PATENT DOCUMENTS

CN 106435632 A 2/2017
WO WO-2016138469 A1 * 9/2016 ............ B01J 19/088

OTHER PUBLICATIONS

Licht, Stuart, et al. "Electrosynthetic control of CNT conductivity & morphology: Scale-up of the transformation of the greenhouse gas CO2 into carbon nanotubes by molten carbonate electrolysis." arXiv preprint arXiv:1607.02220 (2016).*

Golobostanfard, Mohammad Reza, and Hossein Abdizadeh. "Influence of carbon nanotube wall thickness on performance of dye sensitized solar cell with hierarchical porous photoanode." Microporous and mesoporous materials 191 (2014): 74-81.*

Gu, Yuxing, et al. "Sulfur doped reduced graphene oxides with enhanced catalytic activity for oxygen reduction via molten salt redox-sulfidation." Physical Chemistry Chemical Physics 18.48 (2016): 32653-32657.*

R. D. Gupta, et al., "Preparation of Tin-Filled Carbon Nanotubes and Nanoparticles by Molten Salt Electrolysis", ScienceDirect; www.elsevier.com/locate/carbon; Carbon 70, 2014, pp. 142-148.

J. Ren, et al. "Transformation of the Greenhouse Gas $CO_2$ by Molten Electrolysis into a Wide Controlled Selection of Carbon Nanotubes", Journal of $CO_2$ Utilization, www.elsevier.com/locate/icou; Journal of $CO_2$ Utilization 18, 2017, pp. 335-344.

M. Johnson, et al., "Carbon Nanotube Wools Directly from $CO_2$ by Molten Electrolysis: Value Driven Pathways to Carbon Dioxide Greenhouse Gas Mitigation", Materials Today Energy, www.elsevier.com; 2017, 14 pgs.

H. Wu, et al., "One-pot Synthesis of Nanostructured Carbon Materials from Carbon Dioxide Via Electrolysis in Molten Carbonate Salts", Carbon, www.elsevier.com/locate/carbon; Carbon 106, 2016, pp. 208-217.

D. Tang, et al., "Effects of Applied Voltage and Temperature on the Electrochemical Production of Carbon Powders from $CO_2$ in Molten Salt with an Inert Anode", Electrochimica Acta, www.elsevier.com/locate/electacta; Electrochimica Acta 114, 2013, pp. 567-573.

* cited by examiner

| Experimental data | |
|---|---|
| Electrolyte | 50g Li2CO3 + 1 m Li2O |
| Crucible | Alumina, 100 ml |
| Temp, C | 770 |
| $CO_2$ flow rate, mL/min | 60-600 mL/min |
| $CO_2$ inlet temperature | Room temperature (no pre-heating) |
| $CO_2$ inlet flow | Alumina tube: 1-bore (ID=3mm), sparger |
| measurements | Weight of crucible measured every 5 (or 10 min), no electrolysis |

METHODS AND SYSTEMS FOR PRODUCTION OF DOPED CARBON NANOMATERIALS

PRIORITY

The present application claims priority to U.S. Provisional Application No. 62/461,641, filed on Feb. 21, 2017, which is hereby incorporated by reference in its entirety.

RELATED APPLICATIONS

This application is a national phase of PCT/US2018/019035, filed on Feb. 21, 201$, which claims the benefit of U.S. Provisional Application No. 62/461,641, filed on Feb. 21, 2017. The entire contents of these applications are hereby incorporated by reference.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to the production of doped carbon nanomaterials, and specifically to production of doped carbon nanomaterials from a molten carbonate electrolyte.

BACKGROUND

Prior to the recognition of a variety of unique carbon nanoscopic structures such as fullerenes, nanotubes, and nano-fibers starting in 1985, the reduction of carbonates to (macroscopic) carbons in inorganic molten electrolytes from hydroxides and a barium chloride/barium carbonate melt was recognized as early as the late 1800s. Today, the principal methods of carbon doped nanomaterials preparation are arc discharge, laser ablation of carbon substrates, and catalytic thermal chemical vapor deposition (CVD) growth. Doping of these carbon nanomaterials can provide advantageous properties, which have been primarily investigated for carbon nanotube products. These techniques have been expensive, are difficult to implement on a large scale, and result in the current high cost of the doped carbon nanotubes. Related graphene and carbon nano-onion structures are even more costly to synthesize by such methodologies.

Various CVD doped carbon nanotubes can have unusual, useful properties including high electrical conductivity, catalysis, heavy metal removal, enhanced oxygen kinetics and improved charge storage. Sulfur-doped carbons have a range of potential applications, including heterogeneous catalysis, sorption, and energy conversion and storage. However, to date, few approaches have been developed to intrinsically blend sulfur into the carbon matrix. N-doped carbons have a range of potential applications, including $O_2$ oxidation & reduction, fuel cell catalysts, supercapacitors, and sensors. Boron-doping is well known for the production of metallic carbon nanomaterials and enhancing the conductivity of carbon nanotubes. Similarly, P-doping of carbons can greatly affect their properties and applications including reduced elongation fracturing, as aerobic oxidation catalysts, batteries and ultra sensitive sensors. Boron and nitrogen have been the most studied carbon dopants due to their proximity in size (and atomic number) to carbon.

Carbon nanomaterials have great potential as a material resource, with applications ranging from reinforced composites, capacitors, lithium-ion batteries, nanoelectronics, and catalysts, to the principal component of lightweight, high strength building materials due to their characteristic superior strength, electrical and thermal conductivity, flexibility and durability. Organo-metallic reactants using chemical vapor deposition, or arc discharge, are amongst the principal worthwhile, but costly methods of production of carbon nanomaterials. Doping of the carbon nanomaterials when sought by these productions methods is generally achieved as a subsequent post synthesis treatment after these costly syntheses. One recent innovation is the use of a molten electrolysis method to produce carbon nanomaterials. In this process, a molten carbonate electrolyte is disposed between a cathode and anode, a transition metal nucleating agent is added, and an electrical and current is applied to the cathode. This process produces carbon residue in one step and at low energy on the cathode that may include carbon nanomaterials. The cathode in the molten electrolysis production of carbon nanotubes is the electrode upon which this carbon product is deposited.

Previously, the state of the art considered that carbon nanomaterials produced by molten carbonate electrolysis were undoped. There was no expectation or consideration that adding a doping component during the electrolysis would produce doped carbon nanomaterials in a (simple) one-step synthesis. The reasoning behind the assumption was that control of doping and control of electrolytic deposition are both highly structured, highly complex activities. Therefore it had never been contemplated that both doping and electrolytic growth of carbon nanomaterials could synergistically, concurrently take place in a molten medium at 700 to 800° C.

Thus, there is a limitation to the type of carbon nanotubes that can be formed on a substrate by the molten electrolysis method in general. A substantial challenge to the use of undoped carbon nanomaterials is that while they maintain exceptional qualities of strength, thermal conductivity, and flexibility, they cannot differentiated with targeted qualities as electronic wire replacements, specialty catalysts, heavy metal sorbents or improved oxygen or charge storage materials. These undoped carbon nanomaterials alone are less likely candidates to expand the current carbon nanomaterials market demand. Inexpensive, high strength doped carbon nano-materials as a lighter weight replacement for wires, catalysts and electrodes and comprise a major potential market for these materials.

Thus, there has been a demand for production of doped carbon nanomaterials, including carbon nanotubes, graphene, carbon nano-onions and hollow carbon nano-spheres, that may increase the utility of the carbon nanomaterials. Hence, the lack of uniform, doped carbon nanomaterials produced by molten carbonate electrolysis remains a considerable challenge to their deployment. Previous barriers to doped carbon nanomaterials being produced from molten carbonate carbon nanotube synthesis from CO2 are being overcome. This allows for one-pot molten electrolyte production of doped carbon nanomaterials. Such materials are suitable for differentiated targeted qualities as electronic wire replacements, specialty catalysts, heavy metal sorbents or improved oxygen or charge storage materials. However, no carbon doping element to permit production of doped carbonate electrosynthesized carbon nanomaterials has been investigated.

The electrolysis method to produce carbon nanotube products is premised on the presumed lack of effect of doping additives to the electrolyte, or dopant additions to the cathode at which the carbon nanomaterials are formed or anode at which the oxygen is formed in the electrolytic splitting of molten carbonates to carbon and oxygen. The electrolysis method assumes that the cathode could acted to form nucleation sites, not as considered as a source of dopants and that the anode forms a stabilizing oxide layer effective as an oxygen generating electrocatalyst during the electrolysis, but not as a source to provide dopants during synthesis.

For example, it was previously assumed that only dominant electrolyte additives affecting the growth rate and morphology of carbon nanomaterials were of relevance, and therefore the only additives of consequence to the electrolyte were transition metal salts, which could be reduced on the cathode to act as nucleated agents and oxides to form tangled, rather than straight carbon nanotubes. No consideration was give of an additive salt or gas in the electrolyte as a potential source of dopant during carbon nano-material growth.

Thus, there is a need for an efficient method of producing doped carbon nanomaterials from molten carbonate materials. There is also a need to selective produce different morphologies of doped carbon nanomaterials, such as carbon nanotubes, carbon nano-onions, graphene, or hollow carbon nano-spheres, which respectively are particularly useful for high strength, conductive lubricants, high surface catalysts and ion storage in batteries. There is also a need to control both the carbon nanomaterial morphology and doping during molten carbonate electrolysis.

SUMMARY

According to one example, a method for producing doped carbon nanomaterials is disclosed, A carbonate electrolyte is heated to obtain a molten carbonate electrolyte. The molten carbonate electrolyte is disposed between an anode and a cathode in a cell. A nanomaterial doping element such as a lithium sulfate or S02 gas additive is included in the cell electrolyte. An electrical current is applied to the cathode and the anode in the cell. Doped or undoped carbon nanornaterial growth is collected from the cathode of the cell.

Another example is a method for producing undoped carbon nano-onions. Graphene, or hollow nanocarbon spheres is disclosed. A carbonate electrolyte is heated to obtain a molten carbonate electrolyte. The molten carbonate electrolyte is disposed between an anode and a cathode in a cell. Transitional metals that promote carbon nanotube growth are excluded, and a nanomaterial morphology selective element such as added zinc oxide, or an applied AC current is included. An electrical current is applied to the cathode and the anode in the cell. Undoped carbon nanomaterial growth containing predominantly carbon nano-onions, graphene platelets, or hollow carbon nano-spheres is collected from the cathode of the cell.

Another example is a system for producing a carbon nanomaterial. The system includes a current source. The system includes a cell holding a molten carbonate electrolyte between an anode and a cathode. A carbon nanomaterial doping component is located in the cell. The current source is operable to apply an electrical current to the cathode and the anode in the cell to generate doped carbon nanomaterial growth from the cathode of the cell.

Additional aspects of the invention will be apparent to those of ordinary skill in the art in view of the detailed description of various embodiments, which is made with reference to the drawings, a brief description of which is provided below.

Figure 1A:
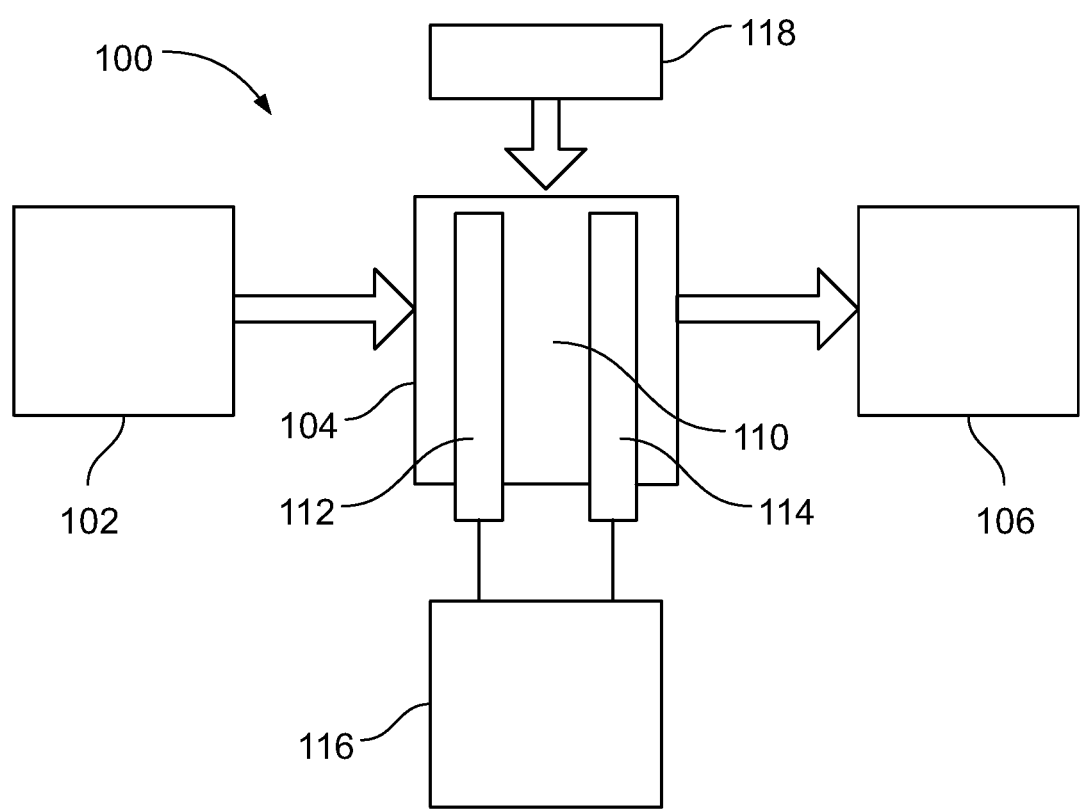
FIG. 1A is a block diagram of an electrolysis system to produce doped carbon nano-materials from carbonate.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of," or "within acceptable manufacturing tolerances," or any logical combination thereof, for example.

FIG. 1A is a block diagram of an example system 100 that produces doped carbon nanomaterials from carbonate materials. The system 100 includes a carbonate furnace 102, an electrolysis chamber 104, and a collector 106. Although the furnace 102, the electrolysis chamber 104, and collector 106 are shown as separate components in FIG. 1A, it is to be understood that they can be in the same physical structure. The electrolysis chamber 104 includes a chamber 110 (cell) that holds a molten carbonate electrolyte produced by heating carbonate in the furnace 102, and contains a morphology element 120 to maximize carbon nanotubes, versus graphene versus carbon nano-onion versus hollow carbon nanosphere product formation. The chamber 110 also contains a doping element 122 to maximize doped versus undoped carbon nanomaterial product formation. An anode 112 and a cathode 114 are coupled to a power source 116. The anode 112 and the cathode 114 are inserted in the chamber 110. $CO_2$ is injected into the molten carbonate from a $CO_2$ source 118. The $CO_2$ is optionally injected into the molten carbonate electrolyte to react with the oxide and renew, rather than consume, the electrolyte, for the overall electrolytic reaction as $CO_2$ converted to $O_2$ at the anode 112 and carbon nano-materials at the cathode 114. Without $CO_2$ injection the electrolyte is consumed and its level falls during the electrolytic reaction. The injection of $CO_2$ may be active (for example bubbled) or passive (direct dissolution from gas at the air/electrolyte interface), or a combination of the two (flowed gas or electrolyte mixing). There may be a variety of $CO_2$ sources for the $CO_2$ source 118.

The carbonate furnace 102 heats a carbonate electrolyte such as pure $Li_2CO_3$ to the respective melting point to produce molten carbonate electrolyte. There may be a variety of mechanisms to power the carbonate furnace 102 such as by solar energy or conventional power plants. Transition metal is added via a disperser to serve as a catalyst. The molten carbonate electrolyte is subjected to electrolysis by being inserted between the anode 112 and the cathode 114 in the electrolysis chamber 104.

Figure 1B:
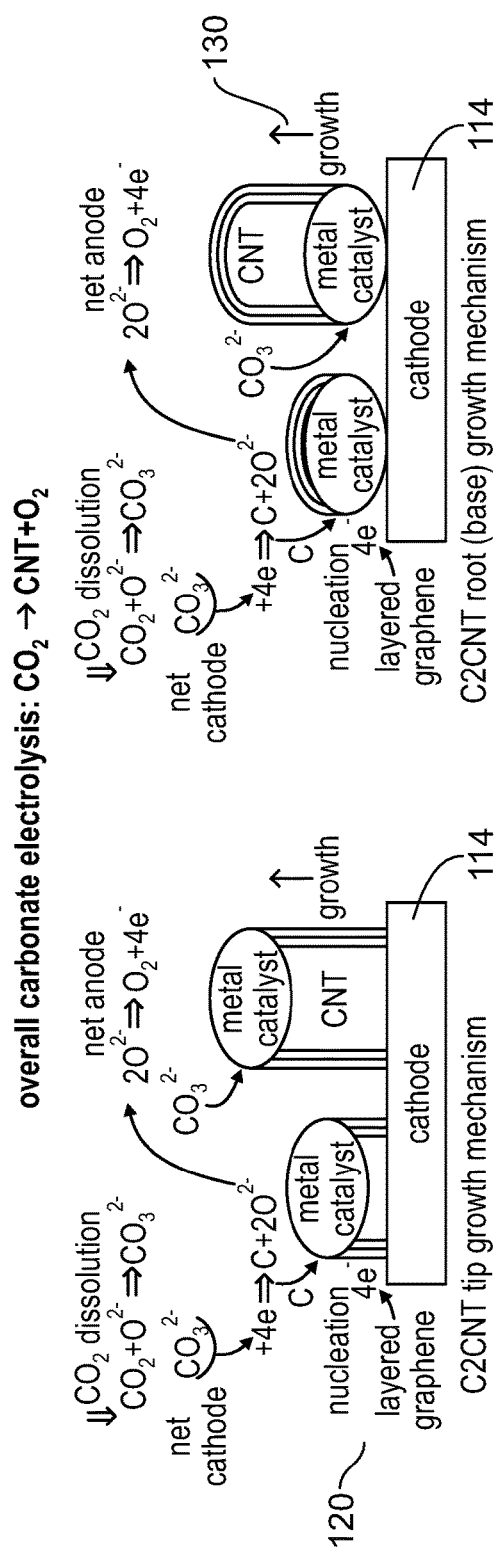
FIG. 1B is an illustrative diagram of different techniques for the production of carbon nanotubes and graphene carbon morphologies.
Figure 1B:
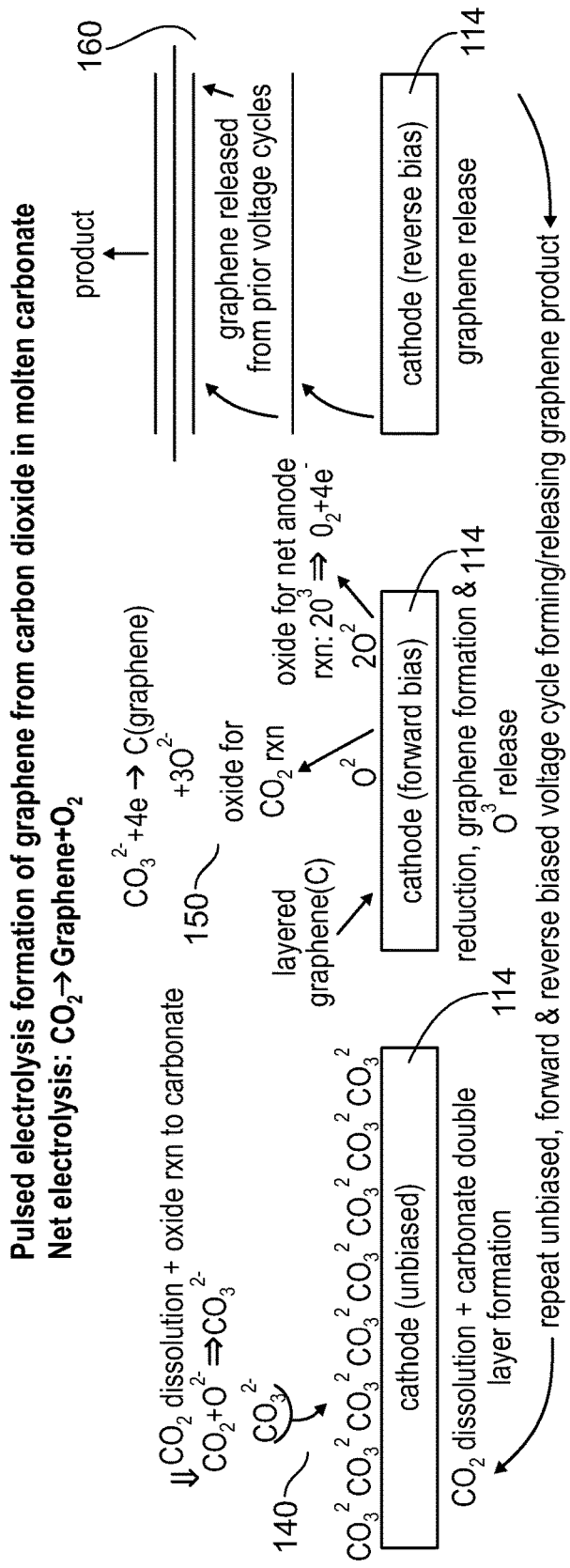

FIG. 1B is an illustrative diagram of different techniques for producing carbon nanotubes and graphene carbon morphologies using the example system 100 shown in FIG. 1A. FIG. 1B shows a first process 120 and a second process 130 of producing carbon nanotube carbon morphologies on the cathode 114. FIG. 1B shows a first process 140, a second process 150 and a third process 160 of producing graphene carbon morphologies on the cathode 114. The processes 120, 130, 140, 150 and 160 are shown without being bound to any theory or such mechanism using the system in FIG. 1A. As may be seen in reference with the processes 120 and 130 in FIG. 1B, in the presence of a nucleation seed such as with certain transition metals, the resulting reaction separates carbon from the carbonate and leaves carbon product such as carbon nanotubes on the cathode 114 from the nucleation sites. Such growth may occur as a tip growth mechanism as shown in the process 120 or a root growth mechanism as shown in the process 130 in FIG. 1B. Of course other growth mechanisms may be possible. As may be seen in reference to the processes 140, 150 and 160 in FIG. 1B, in the absence of a presence of a nucleation seed such as with certain transition metals and with the addition of a pulsed electrolysis current, the resulting reaction separates carbon from the carbonate and forms a carbon product that assembles into the carbon nanotube morphology, such as the illustrated graphene product. The first process 140 uses an unbiased cathode 114. The cathode 114 may be forward biased in the second process 150. The carbon nanotube morphology is pushed away from cathode 114 in the process 160 in FIG. 1A during a reverse cycle of the alternating current. The resulting carbon product is collected in the collector 106 while oxygen is produced on the anode 112. The separated carbon nanomaterials may be cleaned with a solvent or separated from the molten electrolyte by high temperature separation of phase or filtration.

In this example, a carbon nanotube growth elongation element is added to the cell 110 that holds the anode 112, cathode 114 and the carbonate electrode. Such carbon nanotube growth elongation elements may include nickel; copper; chromium; iron; brass, manganese; titanium; zirconium; molybdenum; tantalum; cobalt; silicon; carbon; and alloys and mixtures thereof. In the presence of transition metals, such as Ni, to act as nucleation sites, formation and growth of carbon nanotubes readily occurs under a wide variety of conditions in lithium carbonate mix molten electrolytes. The transition metal can originate from anode dissolution during initial stabilization of the anode surface, or in the case of noble-like oxygen anodes such as iridium, be added as the metal or salt to the electrolyte. As will be explained below, the carbon nanotube growth elongation element may be the cathode material, the anode material or transition metal or the salt of a transition metal added to the electrolyte. In this example, the 770° C. carbonate electrolyte is $Li_2CO_3$, electrolysis is conducted at 0.1 A $cm^{-2}$, and the electrolysis includes a carbon nanotube elongation element of 1 wt % Ni metal powder initially added to the carbonate electrolyte. The cathode 114 is fabricated from Monel or Copper alloy.

Figure 2A:
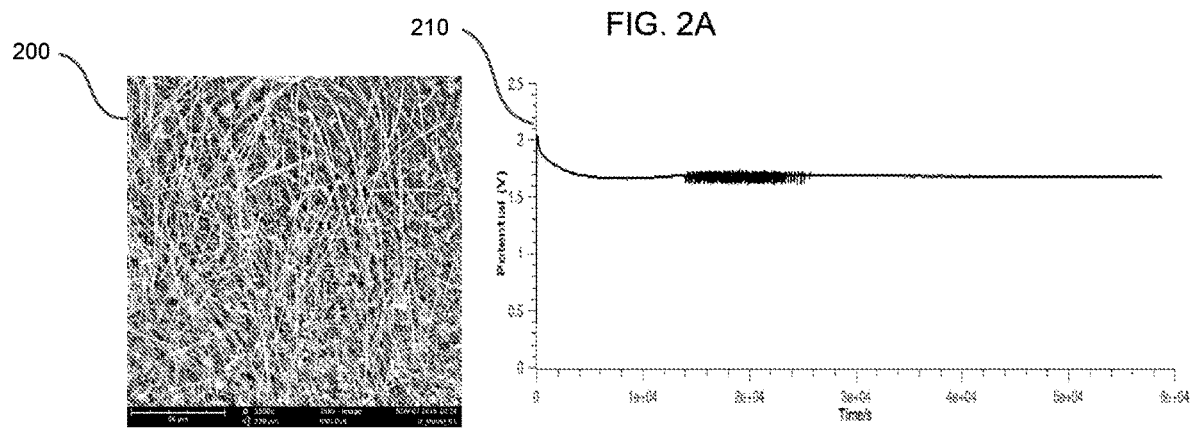
FIG. 2A shows an SEM image of the product and a graph of the measured electrolysis potential using an inert Ir anode and a Monel cathode.

FIG. 2A shows an SEM image 200 of the product morphology that forms nanotubes when higher amounts of Ni powder are added to a 770° C. $Li_2CO_3$ electrolyte. FIG. 2A also shows a graph 210 of the product and a graph of the measured electrolysis potential versus using an inert Ir anode and a Monel cathode for the process. FIG. 2A shows a carbon product in the SEM image 200 when the electrolysis is conducted with an iridium anode. The iridium is highly stable and not capable of releasing transition metal nucleation ions to the electrolyte. Even in this case, when Ni powder is instead added to the electrolyte for inducing nucleation at the cathodes, a uniform carbon nanotube product is observed in the SEM image 200.

Figure 2B:
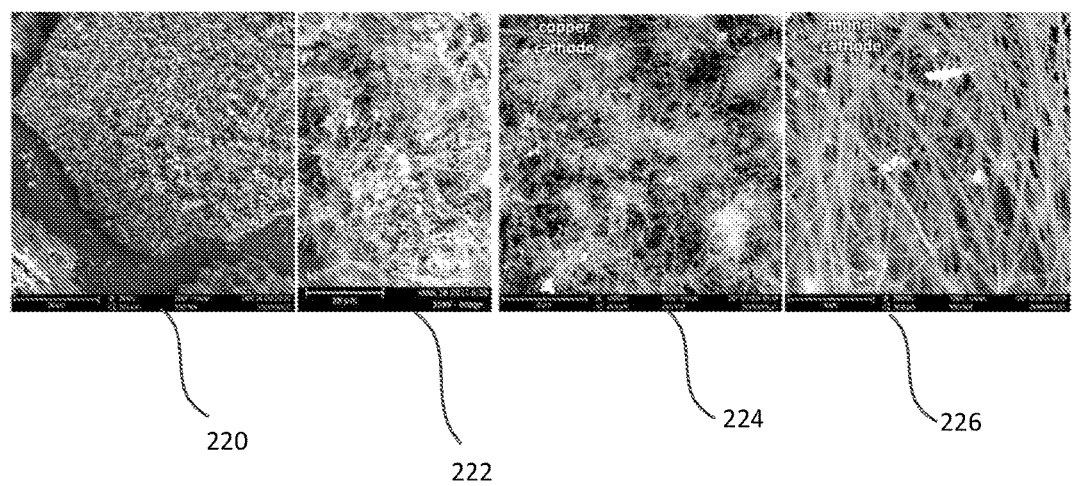
FIG. 2B shows SEM images of the carbon nanotube product with a copper or Monel anode when higher amounts of Ni powder is added to the 770° C. $Li_2CO_3$ electrolyte.

FIG. 2B shows SEM images 220, 222, 224 and 226 of the carbon nanotube product with a copper or Monel anode when higher amounts of Ni powder is added to the 770° C. $Li_2CO_3$ electrolyte. The images 220 and 222 show the product from a Cu cathode with an Ir anode with 0.5 wt % CoO instead added to the electrolyte. The image 224 shows the product resulting from a Cu cathode with a NiChrome anode with 1 wt % added Ni. The image 226 shows the product resulting from a Monel cathode with a NiChrome anode with 1 wt % added Ni.

The products in the images 220, 222, 224 and 226 in FIG. 2B are from electrolysis with a NiChrome, rather than iridium, anode. Uniform carbon nanotubes produced are seen in the SEM images 220, 222 and 224 showing short carbon nanotubes formed at the copper cathode. The SEM image 226 shows long carbon nanotubes formed at the Monel cathode. As shown on the images 220 and 222 of FIG. 2A, even when without added Ni powder and with an Ir anode, but with added 0.5 wt % CoO, cobalt oxide, added to the electrolyte, a uniform carbon nanotube product is formed. The Monel alloy is an alloy of nickel and copper and small amounts of iron, manganese, carbon and silicon. Different carbonate electrolytes such as lithium carbonate; sodium carbonate; potassium carbonate; strontium carbonate; rubidium carbonate; cesium carbonate; barium carbonate; and calcium carbonate may also be used.

Figure 3A:
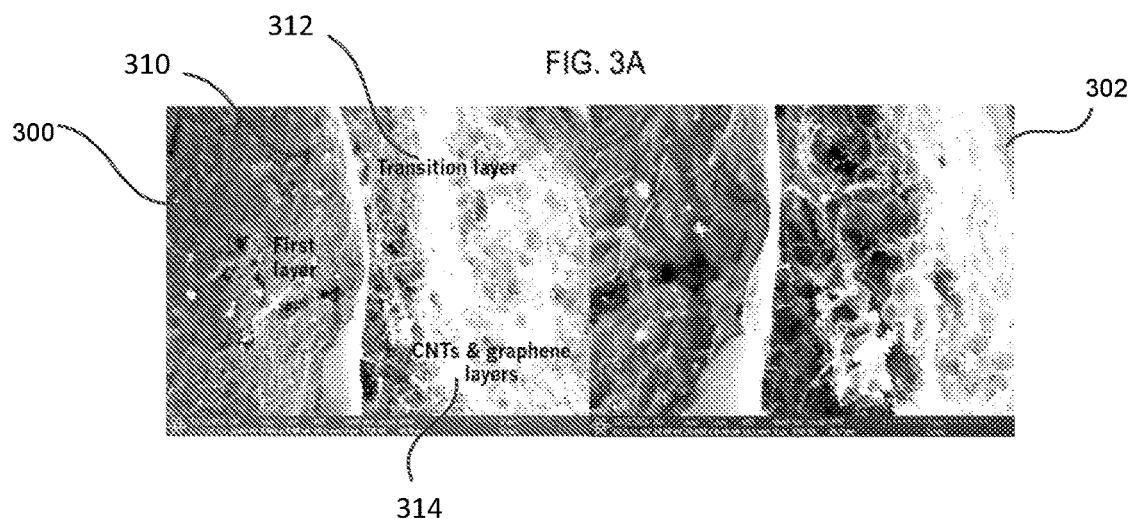
FIG. 3A shows SEM images of product growth under low Ni powder/Ir anode conditions at the interface between the cathode and the electrolyte using product peeled from the Monel cathode.

FIG. 3A shows SEM images 300 and 302 of product growth under low Ni powder/Ir anode conditions at the interface between the cathode and the electrolyte using product peeled from the Monel cathode. As shown in the image 300, the sample includes a layer 310, a transition layer 312 and graphene layers 314. The images 300 and 302 show an example when the nucleating metal availability is restricted through use of an iridium anode with the addition of only 0.1 wt % Ni powder to the 770° C. $Li_2CO_3$ electrolyte. The SEM image 300 of the product subsequent to extended (48 hour) molten carbonate $CO_2$ electrolysis at 0.1 A $cm^{-2}$ at a 5 $cm^2$ Monel cathode shows that the product consists of thin, multilayered graphene. Thin, multilayered graphene sheets are produced from electrolyses that utilize this low transition metal concentration to prevent nucleation sites. The electrolyses are further constrained with an iridium anode (which does not release transition metal ions to the electrolyte), a low level (0.1 wt %, rather than 1 wt %) of nickel powder added to the electrolyte and a Monel sheet cathode. Upon cooling the product is easily peeled from the Monel cathode, and the SEM image 302 shows the cleaned product. The electrode side of the peeled layer is evident in the middle of the SEM image 302 and the remaining product growth occurs to the right of that layer. The remaining product consists of a mix of partially formed carbon nanotubes intermixed with multi-layered graphene sheets, and it is apparent that restricting the nucleation seeding points promotes the formation of graphene compared carbon nanotube in the $CO_2$ reduction product.

Figure 3B:
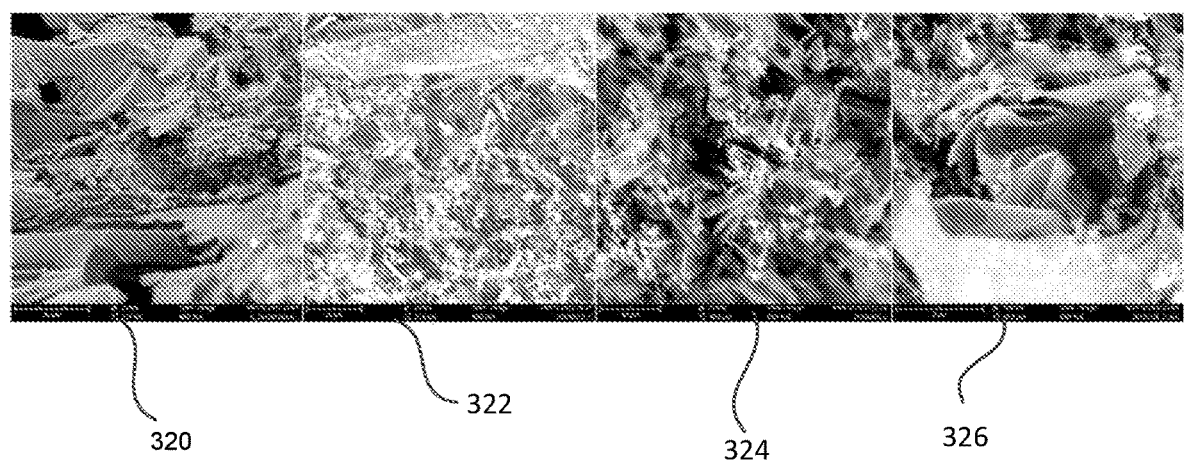
FIG. 3B are SEM images that demonstrate in the absence of nucleating agents, nanostructures such as platelets, rather than carbon nanotubes, dominate in product growth.
Figure 3C:
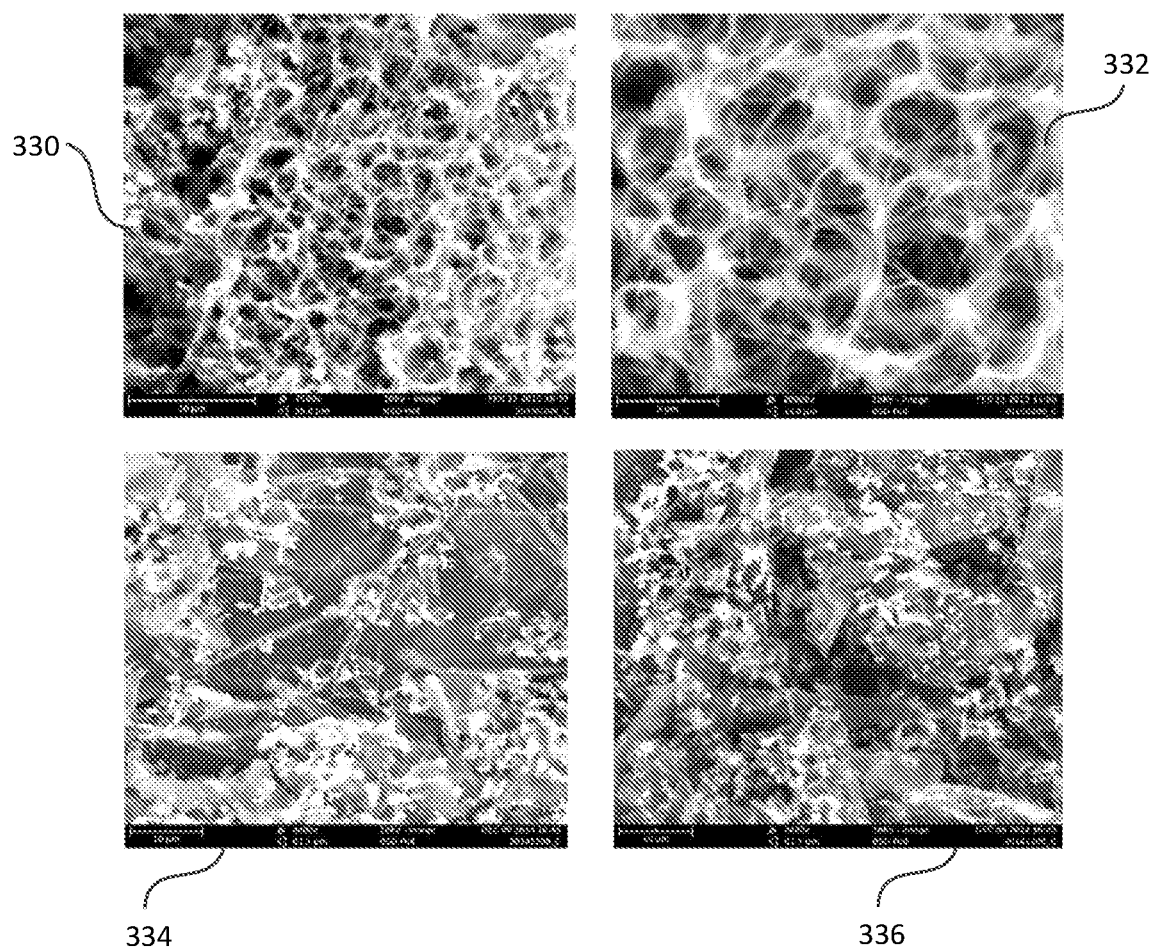
FIG. 3C are SEM images that show that in the absence of nucleating agents, very thin graphene platelets and small carbon particulates are grown.

FIG. 3B are SEM images 320, 322, 324 and 326 that demonstrate in the absence of nucleating agents, nanostructures such as platelets, rather than carbon nanotubes, dominate in product growth. FIG. 3C are SEM images 330, 332, 334 and 336 that show that in the absence of nucleating agents, very thin graphene platelets and small carbon particulates are grown. The SEM images 330 and 332 show product formed by Monel cathodes and the SEM images 334 and 336 show product formed by steel cathodes.

The product in the images 320, 322, 324 and 326 in FIG. 3B and the images 330, 332, 334 and 336 in FIG. 3C show from 0.1 A $cm^{-2}$ electrolyses that a carbon nanotube product morphology is not formed when transition metal nucleating agents are excluded from the electrolysis cell. The product in the SEM image 320 is produced using a Cu cathode with a Ni anode. This process in an extended pure 770° C. $Li_2CO_3$ electrolysis using a larger 100 $cm^2$ planar copper cathodes and Ni anode. In the same electrolyte, the SEM image 322 shows the cathode product using a steel cathode and an Ir anode is used with no (Ni) transition metal being added to the electrolyte. A LiNaK eutectic mix carbonate will lower the carbonate melting point to below 400° C. Potassium carbonate significantly suppresses carbon nanotube formation. Electrolysis products measured using mixed potassium carbonate electrolytes begin to exhibit disorganized, nanostructure character from electrolyses above 600° C. which increases with increasing temperature. However, the LiNaK carbonate is not observed to form a good yield of carbon nanotubes. For electrolyses in the LiNaK, rather than the pure Li, only a small yield (<15%) of carbon nanotubes under any of the electrolysis conditions is produced. The SEM image 324 shows a product formed at 770'C in a potassium carbonate mix (with Li & Na) electrolyte. The product shown in the SEM image 324 is complex, but the bulk of the product is comprised of very thin, multilayered graphite platelets, observed (not shown) up to ~10 mm wide. The SEM image 326 shows that at lower temperature, platelets form in $Li_2CO_3$ even under conditions of iron oxide and lithium oxide addition. The SEM image 326 shows the product subsequent to 0.1 A $cm^{-2}$ electrolysis in 730° C. $Li_2CO_3$ containing 8 wt % $Li_2O$ and 0.4 wt % $Fe_2O_3$ formed with a Ni anode and steel cathode.

As seen in the SEM images 330, 332, 334 and 336 in FIG. 3C, when the nucleating metal is restricted or eliminated through use of a Pt or Ir anode and little or no Ni added to the 770° C. $Li_2CO_3$ electrolyte, no carbon nanotubes are observed, and the product consists of very thin multi-layered graphene sheets. The electrolysis time is 0.5 h with the iridium electrode and a Monel cathode at a constant current density of 0.1 A $cm^{-2}$. When the electrolysis time is restricted to 30 minutes with the iridium electrode, the product is uniform multi-layered graphene sheets without other carbon nanostructures. The electrolysis potential is low (1.2 V) with a platinum electrode and subsequent to 1.5 hours electrolysis with a steel cathode at 0.1 A $cm^{-2}$ small carbon particles are evident in the SEM image 330 as mixed in with the dominant carbon platelet product. The image 330 shows the product produced from using an iridium anode with the addition of only 0.1 wt % Ni powder to the 770° C. $Li_2CO_3$ electrolyte. The SEM image 332 shows the product subsequent to extended (48 hour) molten carbonate $CO_2$ electrolysis at 0.1 A $cm^{-2}$ at a 5 $cm^2$ Monel cathode. The resulting product consists of thin, multilayered graphene. The SEM images 334 and 336 show products from zero nickel experiments. When the nucleating metal is eliminated through use of a platinum anode, and no added nickel to the electrolyte, no carbon nanotubes are observed and the product consists of very thin multi-layered graphene sheets and small carbon particulates as shown by the SEM images 334 and 336. The products were produced by a cathode of 5 $cm^2$ steel, electrolyte 770° C. $Li_2CO_3$ and 3 hour electrolysis at 0.1 A $cm^{-2}$.

Figure 4A:
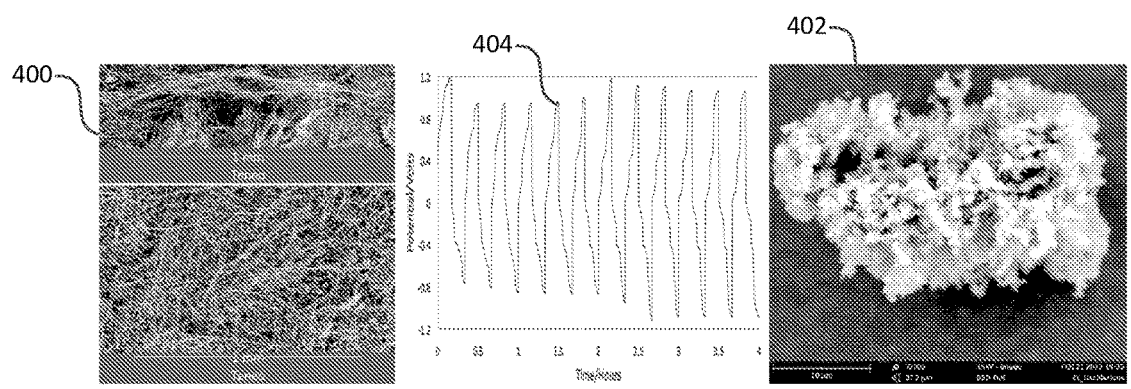
FIG. 4A shows different SEM images of carbon nanotubes and carbon nano-onions produced using a NiChrome anode and Monel cathode.

FIG. 4A shows an SEM image 400 of long carbon nanotubes grown with a constant applied 0.1 A $cm^{-2}$ electrolysis current using NiChrome anode and Monel cathode. FIG. 4A also shows an SEM image 402 of carbon nano-onions produced under the same conditions with the additional step of cycling the current. FIG. 4A also includes a graph 404 that shows the cycling of the current to produce the carbon nano-onions in the image 402, rather than carbon nanotube product. Thus, the SEM image 400 shows a carbon nanotube wool product from $CO_2$ electrolyzed in 770° C. $Li_2CO_3$ aged for 24 hours (to assure an equilibrated electrolyte), followed by immersion of a Monel cathode and NiChrome anode, and an applied electrolysis constant current of 0.1 A cm$^{-2}$, and at measured a electrolysis potential of 1.6V. The electrode composition can also be used to control the carbon nanomaterial product morphology. Nickel anodes generate oxygen throughout the electrolysis at low overpotential. A stable nickel oxide overlayer develops during the first few minutes of the electrolysis by typically releasing a sufficient, low, level of Ni$^{2+}$ into the electrolyte to redeposit as carbon nanotube nucleation points on the cathode. NiChrome is observed to require higher overpotentials (0.2 V increase in over potential at 0.1 A cm$^{-2}$) also acts as an effective, stable anode, but releases both nickel and chromium into the electrolyte which is observed to form a longer carbon nanotube product during extended electrolyses. These longer carbon nanotubes or "carbon nanotube wool", retain a nanoscopic diameter, but attain a long macroscopic (0.2 to 2 mm) length when Monel (a nickel copper alloy) is used instead of steel, titanium or nickel as the cathode, whereas very small carbon nanotubes are synthesized with a copper cathode. Comparison of the SEM images 220, 222 and 224 in FIG. 2B with the image 226 and the image 200 in FIG. 2A and the SEM image 400 in FIG. 4A shows the great variety in carbon nanotube length that may be uniformly produced. Thus, the lengths may be greater than 100 μm, or between 1 to 100 μm or less than 1 μm.

The SEM image 402 shows that a varied, rather than direct, electrolysis current as shown in the current graph 404 can lead to an electrolysis product with an entirely different morphology. In this example, when identical electrolysis conditions are used as those to produce the product shown in the image 400, except that the potential is kept below 1.2 V and cycled, the cathode product exhibits an observed carbon "nano-onion," shown by the image 402 rather than long carbon nanotube morphology. The observed "nano-onion carbon morphology is a new product as derived from a straightforward $CO_2$ electrolysis, by constraining to low potential and cycling the electrolysis constant current density. The nano-onion carbon products are valuable when synthesized via more expensive CVD depositions and are valued at over a million dollar (US) per ton.

Figure 4B:
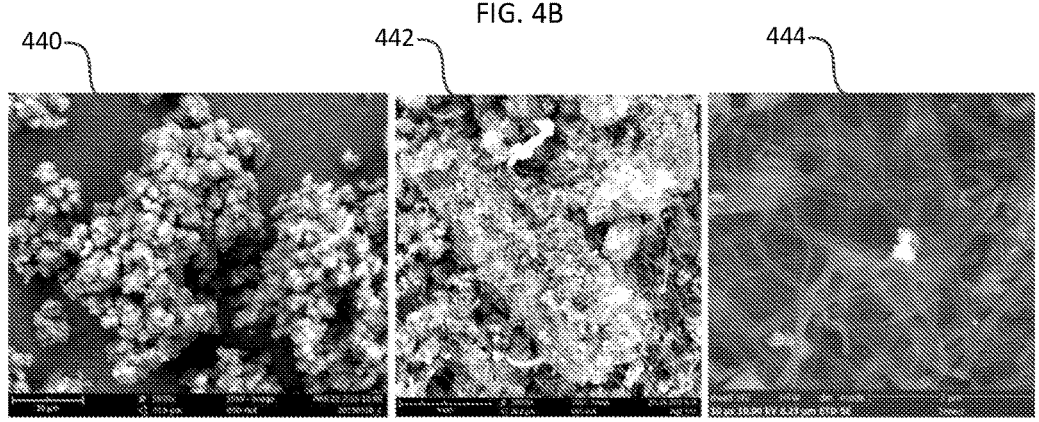
FIG. 4B shows different SEM images of carbon nanotubes including a nano-onion carbon product is obtained without current cycling and a hollow carbon nano-sphere product.

FIG. 4B shows a first SEM image 440 of carbon nanotubes including a nano-onion carbon product, obtained without current cycling when zinc coated steel is used as the cathode, or ZnO is added to the electrolyte, and Ir used as the anode. A SEM image 442 shows a hollow carbon nanosphere product formed (along with carbon nanotubes) with a mixed Li/Mg carbonate electrolyte. A SEM image 444 show a thin walled carbon nanotube product dominates with a mixed Li/Ca carbonate electrolyte.

The SEM image 440 shows a larger carbon nano-onion product produced from applying direct current, rather than alternating current applied electrolysis current. Instead a Zn coated (galvanized) steel cathode and an IR anode is used during the electrolysis. The 420° C. melting point of the Zn facilitates these larger observed carbon nano-onion products. However, a uniform carbon nanotube product dominates (not shown), when a low current pre-electrolysis step is added to initiate the formation of transition metal nucleation points on the cathode. With this pre-electrolysis low current step, replacing the pure $Li_2CO_3$ electrolyte with a mix including 5% $LiBO_2$, 11.4% $MgCO_3$, 0.6% ZnO and 83 wt % $Li_2CO_3$, forms a large proportion of hollow carbon spheres (along with carbon nanotubes) as shown in the washed product in the SEM image 442. The product in the SEM image 442 includes a MgO precipitate (suggesting that unlike $Li_2O$, MgO is highly insoluble in $Li_2CO_3$. A similar electrolyte mix with $CaCO_3$, rather than $MgCO_3$, yields a predominantly thin walled carbon nanotube product as shown in the image 444.

Figure 4C:
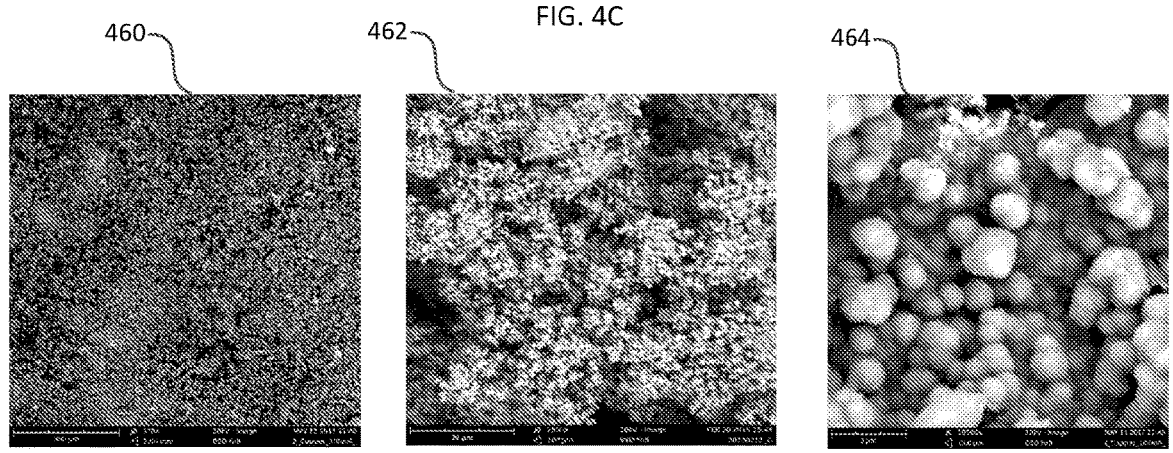
FIG. 4C shows SEM images of nano-onion carbons obtained without cycling when zinc oxide is added to the 770° C. $Li_2CO_3$ electrolyte.

FIG. 4C shows SEM images 460, 462 and 464 of a nano-onion carbon, rather than carbon nanotube, product obtained without cycling when zinc oxide is added to the 770° C. $Li_2CO_3$ electrolyte. The SEM images 460, 462 and 464 show the carbon nano-onion product formed from $CO_2$ on a copper cathode during extended electrolysis. The electrolysis product in the SEM images 460, 462 and 464 is produced with zinc oxide added to the 770° C. $Li_2CO_3$ electrolyte, with a Cu cathode and a Ni anode and at higher current density of 0.2 A cm$^{-2}$. An observed average electrolysis potential of 1.2 V yields a uniform, larger (0.5 to 1 μm) carbon nano-onion product upon extended electrolysis (19.5 h at 20 A, 3.9 Ah cm$^{-2}$ total charge). These electrosyntheses were performed with 100 cm$^2$ planar electrodes. Smaller carbon nano-anions (not shown) are formed during shorter electrolysis charge times.

Figure 5:
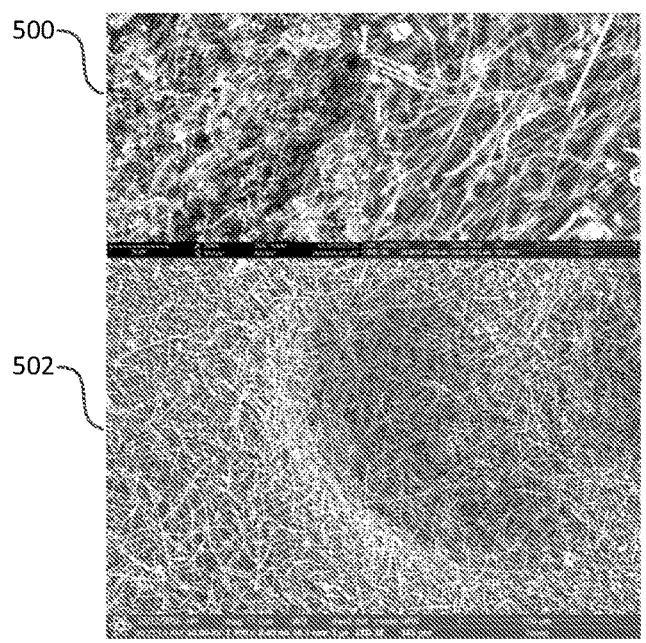
FIG. 5 shows SEM images of the boron doped carbon nanotube products.
Figure 5:
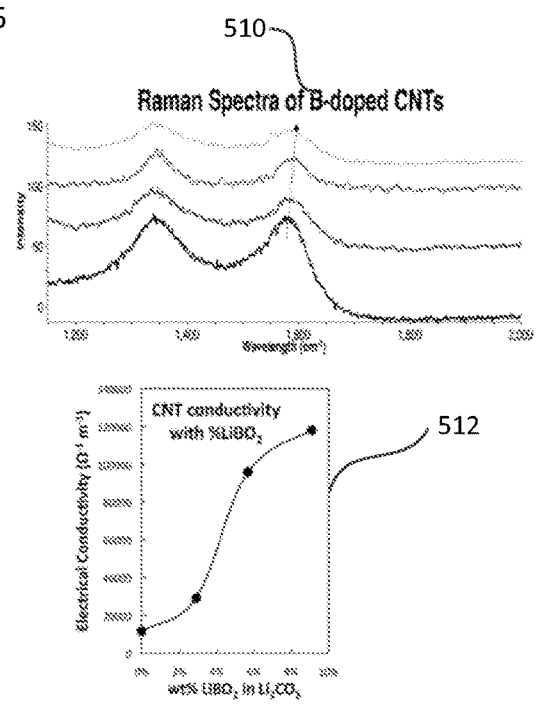

FIG. 5 shows two SEM images 500 and 502 of a boron doped carbon nanotube product formed with an 9 wt % as an additive in the 770° C. $Li_2CO_3$ electrolyte during electrosynthesis. The properties of boron doped carbon nanotubes formed by 1 Ah electrolysis at a 5 cm$^2$ cathode in 5 g $LiBO_2$ and 50 g $Li_2CO_3$ at 770° C. are shown in the SEM images 500 and 502. The product in the images 500 and 502 shows the effect of increasing $LiBO_2$ concentration on a Raman spectral shift shown in a spectrum graph 510 and increasing electrical conductivity of the carbon product as shown in a graph 512. The graph 512 shows the electrical conductivity of carbon nanotubes grown with an increasing concentration of $LiBO_2$ dissolved in the $Li_2CO_3$ electrolyte. The spectrum graph 510 shows the Raman spectra of B-doped carbon nanotubes. The graph 512 shows spectra from the bottom (black) to top (grey) of the $LiBO_2$ addition during the electrosynthesis is 1.5 g, 3 g, 5 g and 8 g in 50 g $Li_2CO_3$.

Pure $B_2O_3$ has a melting point of 450° C. and has a white color but melts clear and the melt is a glass insulator. However when molten $B_2O_3$ contains dissolved $Li_2O$ (mp 1438° C., white, melts clear) it becomes an electrochemical conductive liquid. The binary system of $B_2O_3$ and $Li_2O$ presents a complex phase diagram with an extensive homogenous liquid phase above 767° C. Here, it is that the combined salt of boron and lithium oxides, lithium metaborate, $LiBO_2$ (mp 849° C., white) is highly soluble in $Li_2CO_3$ (dissolves clear), retains a high electrochemical conductivity, and is a successful additive for the one-pot synthesis of boron-doped highly conductive carbon nanotubes.

The methodology of electrolysis of carbonates to convert $CO_2$ into doped carbon nanotubes is simple and without being bound to any theory, in one step involves addition of the desired dopant during the synthesis, for example by electrolysis lithium carbonate which occurs simultaneously with the production of oxygen and dissolved lithium oxide:

$$Li_2CO_3(\text{liquid}) + \text{dopant} \rightarrow C(CNT_{doped}) + Li_2O(\text{dissolved}) + O_2(\text{gas}) \quad (1)$$

$Li_2CO_3$ consumed by electrolysis is continuously replenished by reaction of this excess $Li_2O$, formed as a product in the) electrolysis reaction (1), with $CO_2$ from the air (or $CO_2$ available in higher concentration from stack emissions):

$$Li_2O(dissolved)+CO_2(gas) \rightarrow Li_2CO_3(liquid) \quad (2)$$

The net reaction (combining reactions (1) and (2)) is:

$$CO_2(gas)+dopant \rightarrow C(CNT_{doped})+O_2(gas) \quad (3)$$

The washed, boron doped product is shown in the images 500 and 502. At higher levels of added $LiBO_2$ (>10% by mass), the level of non-uniform impurities in the carbon nanotube product increases (not shown). Specifically, with <10% by mass of $LiBO_2$ plus 50 g $Li_2CO_3$ electrolyte, very good quality, straight carbon nanotubes are formed in the system of 1.5 g, 3 g, or 5 g of $LiBO_2$ respectively. However, there was still ~10% amorphous carbon nanoparticles in the product as estimated from the SEM images 500 and 502. With the 5 g addition of $LiBO_2$, the diameter distribution of the carbon nanotubes (200 to 500 nm) is somewhat larger than observed when no $LiBO_2$ is added. When 8 g of $LiBO_2$ (>10%) was added, the diameter of the carbon nanotubes was quite widely distributed in the range from 150 nm to 1.5 μm, indicating more $LiBO_2$ induced heterogeneity. The high level of $LiBO_2$ may alter the macro-environment of reduction at the cathode, and/or the deposition of boron onto some nickel nuclei can form NiB instead of pure Ni resulting in a more heterogeneous growth patterns with less nanostructure. At 17 wt % added $LiBO_2$ to the $Li_2CO_3$ electrolyte, particles, rather than nanotubes, became the dominant product.

To identify whether the obtained carbon nanotubes are boron-doped carbon nanotubes, or a mixture of boron and pure carbon nanotubes, Raman spectra were recorded using an incident laser of 532 nm and were presented in the graph 510 in FIG. 5. In conventional (boron-free) electrosynthesized carbon nanotubes produced from a pure lithium carbonate electrolyte, the G band, which is related to graphite in-plane mode of $E_{2g}$ symmetry, is observed at 1575 cm$^{-1}$. However, for the samples with $LiBO_2$ added, the G band shifts to higher wave numbers. The upshift indicates that hole carriers have been transferred from boron to the carbon nanotubes. The charge transfer shortens the C—C bond increasing the force constant, and thus enhances the lattice frequency of the carbon nanotubes. In other words, the shifts of the G band to the higher frequency is considered to be caused by the deformation of the graphitic structure with an increasing boron concentration. As seen in the images 500 and 502, when either 1.5 g, 3 g, 5 g or 8 g of $LiBO_2$ has been added to electrolyte prior to the electrosynthesis, subsequent to the synthesis the G band of the product shifts to 1583, 1587, 1589, 1600 cm$^{-1}$, respectively. According to the linear relations between G-band shift and boron-doping level in the study of Ishii et al the boron content was estimated from ~0.7 at % to ~2 at %. Moreover, the D to G ratio, that is the ratio of intensity between the D-band, which is associated with disordered carbon and amorphous carbon, and the graphitic G-band, increases with the increase of added $LiBO_2$. This indicates that an increasing number of defects were generated with the increase of B-doping level. The B-doping was observed to create $B_xC_y$ domains, e.g. $BC_3$ at low doping level[34], or $B_4C$, $B_{13}C_2$ domains at high doping level, and thus increase the defects of carbon nanotubes. Each of these features in the spectra indicate that the resulting samples are boron-doped carbon nanotubes, rather a mixture of boron element and pure carbon nanotubes. It should be noted that the boron-content in B-carbon nanotubes differs substantially from the B/C ratio in the electrolyte. For example, 8 g of $LiBO_2$ added to the 50 g of $Li_2CO_3$ is a B/C=31 at % in the electrolyte, but only resulted in ~2% of boron obtained in the carbon nanotube sample product. There is no indication that (other than the improved conductivity that will be shown) the excess $LiBO_2$ in the electrolyte is harmful and this large difference between the percentage of boron added to the electrolyte and the percentage of boron in the product appears to be related to the voltage of reduction of lithium metaborate into boron-element, which is ~2.015V at 770° C. (1043K) according to the thermodynamic calculations of reaction (4) from the entropy and enthalpies of the individual species. This is higher than the reduction of carbonate to carbon, which is <1.6V, and during simultaneous deposition at the cathode (depending on kinetics) will tend to favor the formation of carbon over boron at the cathode:

$$2LiBO_2 \rightarrow 2B+Li_2O+3/2O_2 \quad (4)$$

Boron-doping is known for the production of metallic carbon nanotubes and enhancing the conductivity of (CVD synthesized) carbon nanotubes. To investigate the boron dopant effect on molten carbonate synthesized carbon nanotubes on the conductivity, samples were measured with increasing level of boron dopant and is compared to the products shown in the images 500 and 502 in FIG. 5. As a comparison, the conductivity of amorphous carbon nanoparticles, straight carbon nanotubes, and tangled carbon nanotubes electrosynthesized from $Li_2CO_3$ melts were also measured. The 9 wt % $LiBO_2$ electrolyte synthesized carbon nanotubes exhibit one order of magnitude conductivity higher than straight carbon nanotubes (formed in pure $Li_2CO_3$), and 30 fold higher than amorphous carbon nanoparticles or electrosynthesized tangled carbon nanotubes (added oxide, such as 4 m $Li_2O$ (10.7 wt %) in the $Li_2CO_3$ electrolyte adds defects and results in tangled carbon nanotubes). Among samples with the added B-dopant, the conductivity first rose from an addition of 1.5 g of $LiBO_2$ to the synthesis electrolyte, until a maximum for 5 g $LiBO_2$ and then decreased at higher concentrations of added $LiBO_2$. The boron doping enhanced the conductivity but an excess of added boron (>10 wt % $LiBO_2$ in the electrolyte) decreased the quality (less carbon nanotubes, more nanoparticles), Hence, there is an observed conductivity maximum with increased $LiBO_2$ addition.

The successful and direct pathway here for the one-pot electrosynthesis of boron doped carbon nanotubes from carbon dioxide via the addition of a soluble lithiated dopant to the molten carbonate electrolyte suggests a similar pathway and opportunity for the synthesis of other doped carbon nanotubes, such as nitrogen, phosphorous or sulfur doped nanotubes. Different dopants inserted into carbon nanomaterials at different concentrations change both their physical and chemical properties.

Boron and nitrogen have been the most studied carbon dopants due to their proximity in size (and atomic number) to carbon. The common polyatomic anions metaphosphate, nitrate, and sulfate with lithium as the cation ($LiPO_3$, $LiNO_3$ or $Li_2SO_4$), are soluble in molten lithium carbonate. Compared to the 3e$^-$ reduction needed to form elemental boron as a dopant from lithium metaborate, $LiBO_2$, $LiPO_3$ and $LiNO_3$ would respectively require a 5e$^-$ reduction to form elemental phosphorus or nitrogen, and $Li_2SO_4$ requires a 6e$^-$ reduction to form sulfur. Whereas boron, phosphorus and nitrogen are less electronegative than carbon, sulfur is more electronegative. Hence, as a rough estimate (based on electronegativities and without attempting to predict competing kinetic phenomena) carbon may be easier to form by electrolysis from the oxide, than boron, phosphorus or nitrogen, making the latter oxides good candidates for simultaneous reduction to elemental dopants during carbon nanotube electrosynthesis, whereas sulfur may be a thermodynamically preferred reduction product to carbon nanotubes, which could inhibit carbon nanotube formation in a sulfate containing electrolyte.

Figure 6:
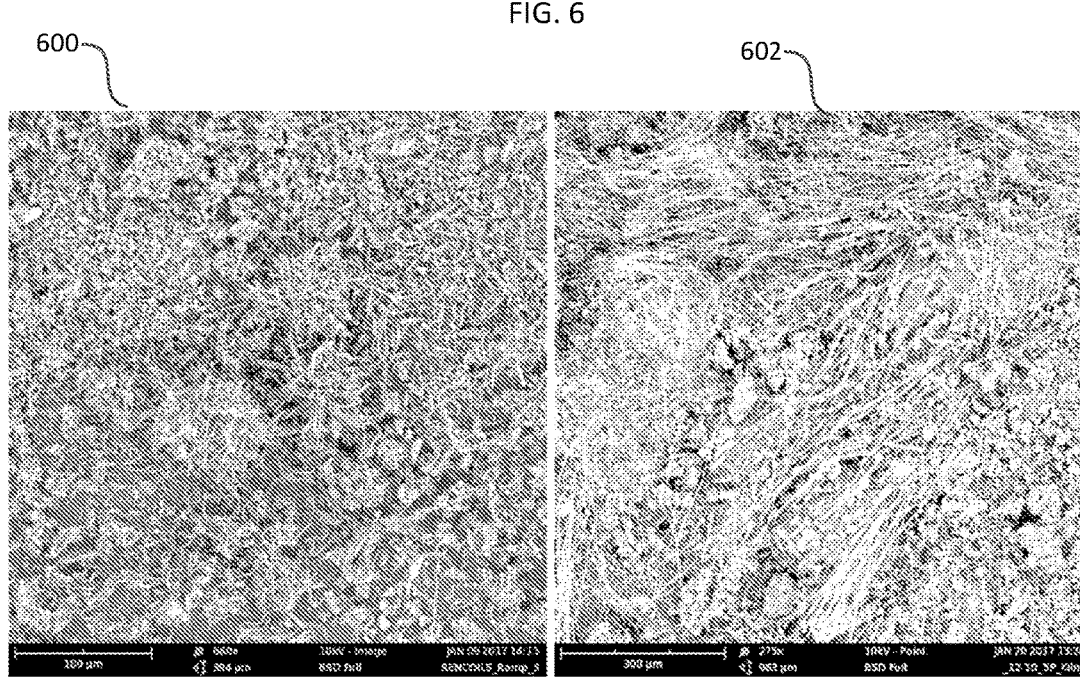
FIG. 6 shows SEM images of the sulfur and nitrogen doped carbon nanotube products formed by electrolysis of $Li_2CO_3$ containing either dissolved $Li_2SO_4$ or $LiPO_3$ as the respective source of either sulfur or phosphorous in the carbon nanotubes.

FIG. 6 shows SEM images 600 and 602 of sulfur and nitrogen doped carbon nanotube products formed by electrolysis of $Li_2CO_3$ containing either dissolved $Li_2SO_4$ or $LiPO_3$ as the respective source of either sulfur or phosphorous in the carbon nanotubes. The SEM image 600 shows a P-heteratom long (300-600 µm) product produced with an intermediate 0.8 Ah $cm^{-2}$ charge at a low current density of 0.03 A $cm^{-2}$; a conventional (Ni 200) anode and no Ni powder added to the electrolyte during this synthesis. The use of $LiPO_3$ facilitates salt dissolution in the lithium carbonate electrolyte. Variations which led to the improved length and yield of phosphorous containing carbon nanotubes include an increase from 1% to 5 mol % $LiPO_3$, and the use of a Monel, rather than galvanized steel, cathode. Electron dispersive spectroscopy (EDS) of the carbon nanotube product measured 0.3 mole % of phosphorous in the carbon nanotube product. This is substantially lower than the electrolytic concentration of phosphorous, and the P-heteroatom may provide a poor lattice match to the carbon nanotube.

The SEM image 602 shows carbon nanotubes containing sulfur from molten carbonate electrolysis with 0.1 mole % sulfate subsequent to a 2-hour electrolysis at 1 A (using the conventional galvanized steel cathode and Ni 200 wire anode and without added Ni metal powder). Electron dispersive spectroscopy of the carbon nanotube product measured 0.1 mole % of sulfur in the carbon nanotube product. As in previous experiments, prior to this higher current extended electrolysis, cathode nucleation was facilitated by an application of lower constant currents sequentially applied (each for 10 minutes) and increased from 0.05, 0.10, 0.25 to 0.5 A. The initial 10 minutes lowest current electrolysis occurred at a potential of 0.4 to 0.5 V, which is consistent with the expected nucleation by Ni on the cathode while each of the subsequent increasing constant currents occurred at increasing potentials between 1 to 2 V. No carbon product (carbon nanotube or otherwise) was observed to form at the cathode during the electrolysis with higher sulfate concentrations, such as 1 mol % (or 3, or 5 mol %) $Li_2SO_4$ in 770° C. $Li_2CO_3$. The observed potentials at 1 A are lower with higher [$Li_2SO_4$] (and are lower than the 1-2 volt electrolysis potential observed without $Li_2SO_4$). This lack of carbon nanotube formation at higher sulfate concentration is in accord with the electronegativity of sulfur compared to carbon, which favors the thermodynamic formation of the former compared to the latter. To improve the energetics of carbon formation, the concentration of sulfate is decreased (relative to carbonate) creating a pathway to the observed formation of sulfur containing carbon nanotubes.

A carbon nanotube product is also observed from electrolysis of $LiNO_3$ in the 770° C. $Li_2CO_3$ electrolyte. In this case, the yield of carbon nanotubes improves with a 5 mole %, compared to a 1 mole %, dissolution of $LiNO_3$ within the electrolyte. Presumably, the added, dissolved lithium nitrate equilibrates to lithium nitrite in the molten electrolyte. This is analogous to the known solid state thermal decomposition for solid $LiNO_3$ that occurs above 500° C.

$$LiNO_3 \rightarrow LiNO_2 + 1/2 O_2 \qquad (5)$$

Electron dispersive spectroscopy analysis, subsequent to electrolysis, indicates nitrogen in the carbon nanotube product.

Dopants have been demonstrated as introduced during the synthesis by dissolution of oxide containing dopants into the electrolyte. It is evident that pure elements or other salts can also be employed to introduce dopant additives. Examples of such additives, by way of illumination and without being restricted by this example, include sulfur, boron, thionyl chloride, sulfur chloride, silicon chloride, boron chloride, or borochlorate, thionyl nitrate, silicon nitrates and nitrites, boronitrides, and boronitrates.

The example demonstrates that dopants may be input to the electrolyte through the gas phase, rather than by dissolution of solids or liquids in the electrolyte. Molten carbonate carbon dioxide electrolytic splitting occurs in facile (high current density) and low energy (low electrolysis potential) manner with cold or hot inlet gas, gas containing from 0.04% (atmospheric), or 5 to 13% (as in natural gas or coal power plant flue gas, or 33% (as in cement flue gas) or 100% $CO_2$ concentration. Here, a gas is mixed to simulate a coal plant flue gas containing average $SO_2$ and NOX concentrations. NOX, and $SO_2$ and $CO_2$ in the correct proportions to air are continuously added through a duct fan inlet prior to entering the carbonate electrolyzer. The $CO_2$ flow rate is and measured at 76 liter/minute (for the 200 kg daily transformation of $CO_2$ to carbon nanomaterials) by a calibrated Omega mass flow controller MA5400/500 mass flow controller, which is for up to 131 liter/minute flow. NOX is generated in lab by the reaction of copper metal with nitric acid; the rate is controlled by acid strength and relative thickness of the copper. More NO is produced at lower nitric acid concentrations (4 molar NO), while pure brown $NO_2$ is formed in concentrated nitric acid. The 4 molar nitric acid gradually turns from colorless to blue as the $Cu^{2+}$ enters the solution. Similarly, $SO_2$ is produced by the direct reaction of sulfur powder with sulfuric acid. Inlet gas air flow rate is monitored with an in-line Digi-Sense Hot Wire, a thermoanemometer with NIST traceable calibration. The NOx and $SO_2$ bubbled into the electrolyzer at the low (ppm) levels of NOx and $SO_2$ did not impact on the observed carbon nanotube physical chemical characteristics or formation.

Figures 7A, 7B:
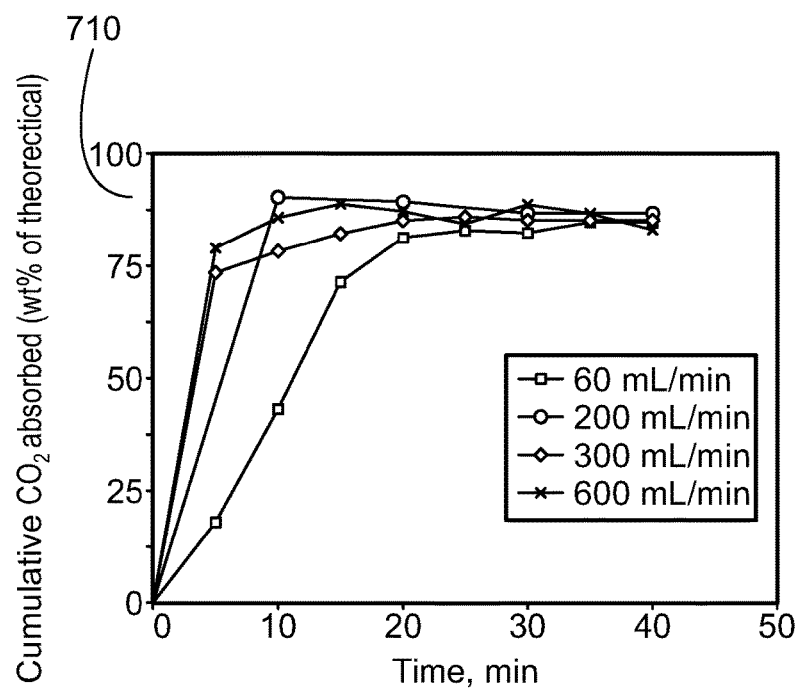
FIG. 7A is a table of experimental data that demonstrates that the carbonate electrolyte can absorb carbon dioxide at rate sufficient to maintain the highest rates of molten carbonate electrolysis and that with sufficient insulation, the molten carbonate electrosynthesis is self heating and/or may generate useful excess heat.
FIG. 7B shows a plot of the data derived from the experimental data in FIG. 7A.

The example demonstrates that the carbonate electrolyte can absorb carbon dioxide at rate sufficient to maintain the highest rates of molten carbonate electrolysis and that with sufficient insulation, the molten carbonate electrosynthesis is self heating and/or may generate useful excess heat. FIG. 7A shows a data table 700 that demonstrates the extraordinarily rapid rate of carbon dioxide absorption from the gas phase into molten lithium carbonate and molten lithium carbonate mixtures was experimentally determined and documented. Even the lowest carbon dioxide concentrations studied (0.04% $CO_2$ using conventional air) is sufficient to maintain and renew all molten lithium carbonate in an open air system during electrolyses conducted at constant current density of 0.1 A/$cm^2$. During the electrolysis, lithium oxide is co-generated at the cathode, which reacts with carbon dioxide continuously renewing the electrolyte. FIG. 7B shows a graph 710 of the rate of carbon dioxide absorption from the data in the table 700. As demonstrated in the data table 700 in FIG. 7A, the rate of carbon dioxide gas absorption bubbled into even a small amount (50 g) of molten lithium carbonate is not limited until the flow rates is well over 0.3 liters $CO_2$ per minute, and as expected (not shown) further increases with added lithium oxide concentration (as generated by rapid electrolysis rates). The $CO_2$ cumulative absorbed on the vertical axis is limited to just below 100% due to the natural lithium oxide concentration which occurs on equilibrium with the lithium carbonate electrolyte. During the most rapid rate of electrolysis examined here of 1 amp/cm², gas containing $CO_2$ must be bubbled into the electrolyte, otherwise electrolyte would be consumed and the level of electrolyte visibly falls under those circumstances with bubbling a constant mass of electrolyte is maintained during the electrolysis.

Figure 7C:
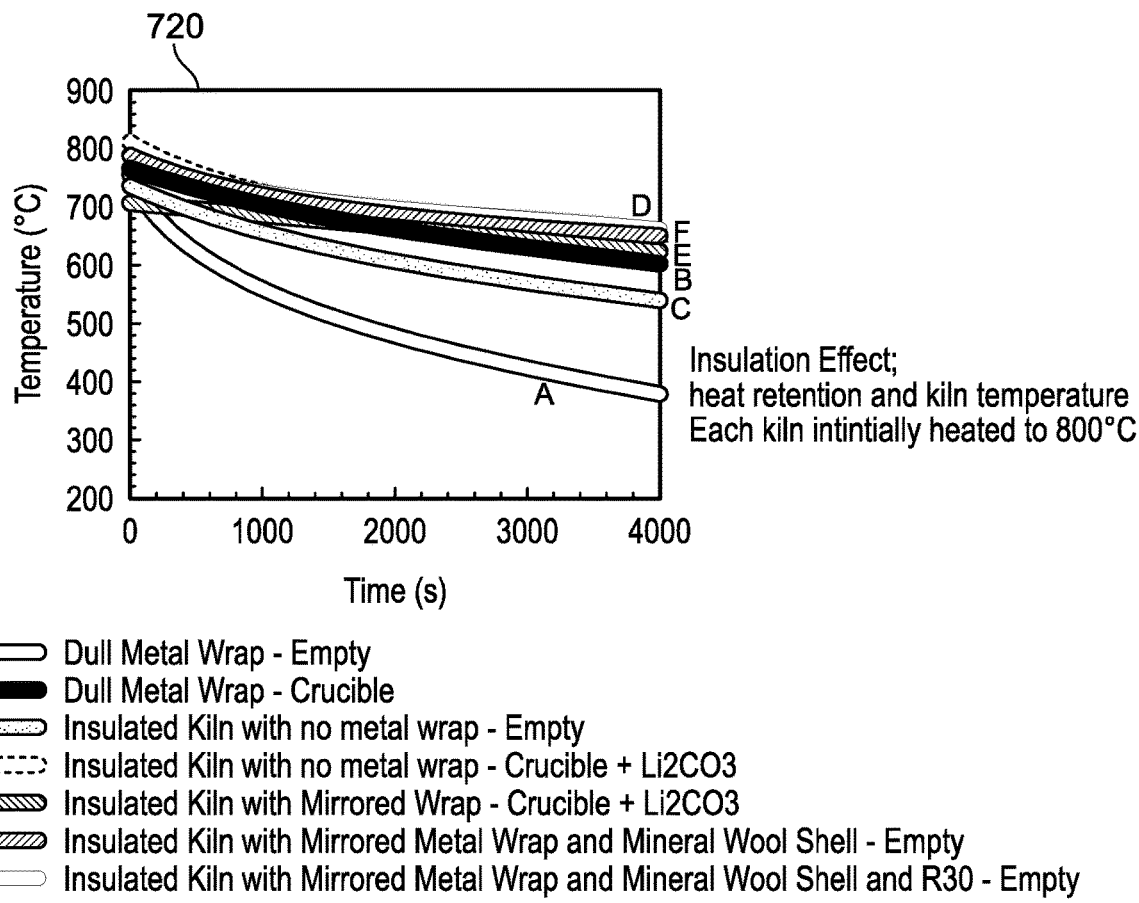
FIG. 7C shows a graph that demonstrates that the heat is largely retained in the molten electrolysis chamber with adequate insulation.

FIG. 7C is a graph 720 that demonstrates that the heat is largely retained in the molten electrolysis chamber with adequate insulation. Improved heat retention is seen with increasing levels of insulation in a kiln built using 9×4.4×2.4 inch firebricks along with 24×9×4 inch firebricks (purchased from BNZ,) and the heating elements and control circuits from a commercial Paragon Caldera kiln, and a custom thermal radiative shield was cut to be added as an intermediate kiln case from 0.034" thick mirror finish 304 stainless steel (purchased from onlinemetals.com). One inch thick, highly insulating, rigid ceramic insulation was included as a barrier on all sides as a high temperature resistant, very low heat flow rate (K=0.28 at 800° C., purchased as Mcmaster.com product no. 6841K5 Extra-High Temperature Ceramic Insulation) thermal protective barrier, and is visible as the outer white edge, on the in construction kiln cover in addition to the grey furnace mortar. Prior to the addition of the carbonate electrolysis chamber, a fourth layer of thermal insulation (in addition to the firebrick, radiative barrier and ceramic insulation (was added as mineral insulation, yellow-green and purchased as Mcmaster.com product no. 9328K43 2" thick Very-High Temperature to 65-C Mineral Wool Insulation Sheets)) to the kiln, and finally an outer coating of pink R-30 Home Depot insulation was added as a final insulator and barrier to heat loss as seen in the photos below (prior to reinsertion of the electrolysis chamber. Then a final added R-30 exterior insulation (purchased from Home Depot as conventional house insulation) prior to subsequent addition as the final outer layer of the kiln.

Figure 7D:
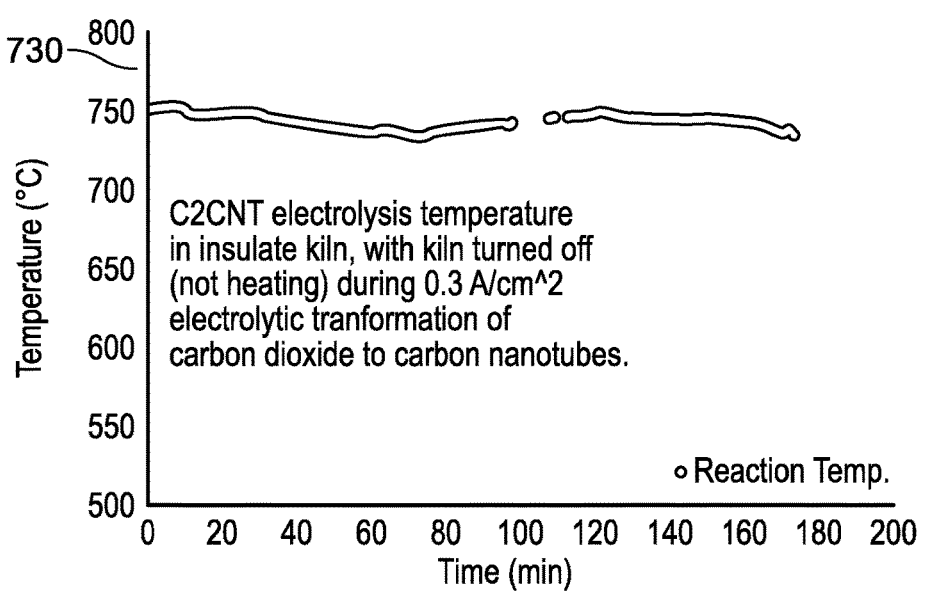
FIG. 7D shows a graph that demonstrates that the molten carbonate electrosynthesis is self heating.

FIG. 7D is a graph 730 that demonstrates that the molten carbonate electrosynthesis is self heating. A major breakthrough was reaching the critical thermal balance in which the molten carbonate process requires no external heating even though it's a high temperature molten salt process. The custom built kiln with carbonate electrolysis chamber was raised to 725° C. (higher than the melting point of the lithium carbonate electrolyte), and then all kiln heating power turned off and the kiln was unplugged. At a 0.1 cm⁻² of constant electrolysis, the carbon dioxide to carbon nanotube process independently maintained a constant temperature of 727° C. In accord with the expected exothermic nature of the $CO_2$ and $Li_2O$ reaction to constantly renew the electrolyte (and absorb the CO2), this temperature is observed increased to 737° C. when $CO_2$ gas (unheated, pure) is bubbled in at a high precise rate comparable to the rate at which $CO_2$ is consumed by the electrolysis. This temperature increased to 787° C. when the current density and (proportional $CO_2$ flow rate) is increased to 0.5 A cm⁻², and decreased to 750° when the current density is decrease to 0.3 A cm.⁻². The graph 720 in FIG. 7C shows the performance at a continual of the constant electrolysis current density of 0.3 A cm⁻², and it is seen that this constant temperature of 750° C. is maintained throughout the duration of the electrolysis. The outlier measurement in the middle of the experiment were not included in the graph 720 due to a poor thermocouple connection, which was remedied.

A one step molten carbonate electrosynthesis of doped carbon nanotubes is demonstrated for boron, nitrogen, sulfur and phosphorus doped carbon nanomaterials. In an analogous manner multiple dopant source materials and types should lead to the electrosynthes of carbon nanotubes with multiple dopants, and this simple synthetic approach as applied to a wide variety of simple additives to the electrosynthesis will open a wider portfolio of doped carbon nanomaterials for example containing and doped with one or more of the following: boron, silicon, germanium, nitrogen, phosphorus, arsenic, antimony, sulfur, selenium, tellurium, gold, alkalis or alkali earths, nickel; copper; chromium; iron; manganese; titanium; zinc, zirconium; molybdenum; tantalum; platinum; iridium; cobalt; silicon; and (other than CU) isotopic carbon.

When the material to be deposited with the carbon nanomaterial requires an electrolysis potential greater than that required to deposit carbon from carbonate, than a two step molten carbonate synthesis can successfully deposit the material. As an example, silicon was not found in the product that was deposited in a one step 770° C. electrosynthesis during electrolysis in a $Li_2CO_3$ electrolyte containing nickel powder and $Li_4SiO_4$. A two step electrosynthesis process results in successful deposit of desired material. The first step performs electrolysis in an electrolyte with 0.42 g nickel powder and 52 g of $Li_2CO_3$ (and no $Li_4SiO_4$). Then the electrodes are moved to continue the electrolysis in the second step in a second electrolyte consisting of 18.4 g of $Li_4SiO_4$ and 40.2 g of $Li_2CO_3$ (and no nickel powder). The observed electrolysis potential is 1.4V for the first step and higher at 2.3V for the second step. The resulting washed product exhibits carbon nanotubes as observed by a SEM image. In the resulting nanotubes, Si based carbon was observed as evidence by both electron dispersive spectroscopy and by the formation of a new Si peak at 480 cm⁻¹ arising in the measured Raman spectrum.

Figure 8:
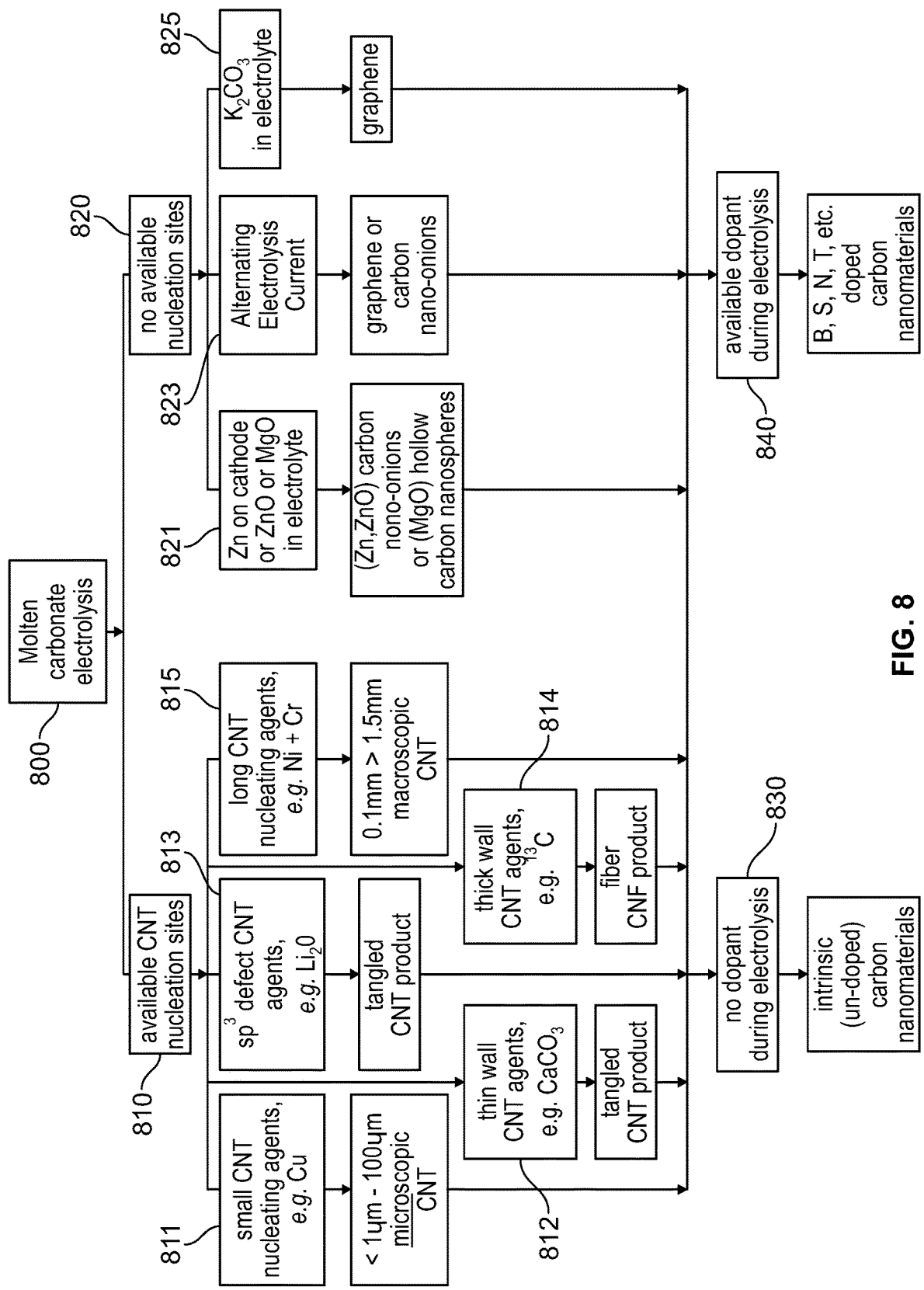
FIG. 8 is a schematic of synergistic pathways to doped or undoped carbon nanotube materials including carbon nanotubes, graphene, carbon nano-onions or hollow carbon nano-spheres carbon nanomaterials.

Without being bound to any theory or pathway, FIG. 8 is a schematic representation of known and new synergistic pathways of the single step electrolysis of molten carbonate 800 to form nucleated carbon nanotubes or carbon nano-onions, graphene, or hollow carbon nano-spheres, all which may be formed doped or undoped. FIG. 8 shows known synthetic sequence pathways 810 and 820.

In FIG. 8, the pathway 820 uses no nucleating agent and provides a facile pathway to form nano-onions, graphene, or hollow carbon nano-spheres. In a pathway 821, ZnO or MgO is added to the carbonate electrolyte and respectively induces formation of carbon nano-onions, graphene, or hollow carbon nano-spheres. In a pathway 823, an alternating, rather than direct, electrolysis current applied between the anode and cathode forms graphene or (with ZnO in the electrolyte or a Zn cobalt on the cathode) carbon nano-onions. In a pathway 825, $K_2CO_3$ induces formation graphene platelets at the cathode.

In FIG. 8, the pathway 810 uses a nucleating agent and provides a facile pathway to form carbon nanotubes and carbon nanofibers. The nucleating agents are specific transition metals, or combinations thereof, and may be dissolved into the electrolyte, released from the anode, or contained in the cathode to form nucleation sites for carbon nanotube or carbon nanofiber growth from the cathode. In a pathway 811 specific nucleating agents, e.g. Cu, induce short carbon nanotube growth. In a pathway 815 specific nucleating agents, e.g. Ni & Cr, induce long carbon nanotube growth. In a pathway 813, the addition of increased soluble oxide levels to the carbonate electrolyte causes a high level of measured sp³ defects leading to observed tangled, rather than straight, carbon nanotubes. In a pathway 812, the addition of thin wall agents, such as CaCO3 which decreases oxide solubility in the carbonate electrolyte causes formation of thin walled carbon nanotubes. A pathway 814, where the natural abundance ¹²C was replaced with ¹³C, and induces filling or closing of the carbon nanotube core, thick walled, thin cored carbon nanotubes or filled carbon nanofibers are produced.

FIG. 8 also shows synthetic sequences 830 and 840 that feature exclusion of dopants in the sequence 830 or addition of dopant sources in the sequence 840 to the molten carbonate electrolyses. This leads to either intrinsic (undoped) or doped alternatives of the pathways 811-815 and 821-825. Carbon nanomaterial products including a portfolio of either doped or undoped carbon nanotube morphologies result from the pathways 811-815 and either doped carbon nano-onions, graphene, or hollow carbon nanospheres result from the pathways 821-835.

In FIG. 8, the pathway 830 shows the exclusion of dopant sources to the molten carbonate electrolyses leads to the production of intrinsic (undoped) or carbon nanomaterials formed at the cathode.

In FIG. 8, the pathway 840 shows the availability of dopant sources to the molten carbonate electrolyses that leads to the production of doped (e.g. boron, sulfur, nitrogen or phosphorous doped) carbon nanomaterials formed at the cathode. In FIG. 8, the desired dopant sources are made available as a variety of individual or combined sources in the molten carbon electrolysis in the pathway 840. The sources include the direct addition of a salt, covalent or element compound containing the dopant in the solid, liquid or gas form directly to the electrolyte, addition or addition of the dopant using materials contained in the anode or cathode electrode.

It is the synergistic combination of multiple nucleation agent elements, such as the addition of a specific type, and concentration of transition metal(s), addition or exclusion of an oxide, and addition or exclusion of isotopic carbon produces, along with carbonate composition, electrolysis, charge, time, and temperature that produces the carbon nanotubes of different morphologies.

In contrast, a new pathway 840 uses the directed addition of sources with dopant atoms during the molten carbonate electrolysis to form doped, rather than intrinsic, carbon nanomaterials, with specific, desired, different chemical physical properties, and the electrolysis is conducted directly without the need to induce doping as a post treatment.

Also in contrast, the new pathway(s) from the pathway 820 use the directed exclusion of nucleating agents to direct the specific formation of new (non carbon nanotube) carbon nanomaterial morphologies of during molten carbonate electrolysis. The new pathways 821, 823 and 825, and synergistic combinations of those pathways, form carbon nano-onions, graphene, or hollow carbon nano-spheres cathode products.

Dopant atoms introduced during the molten carbonate electrolysis are directly incorporated into the carbon nanomaterial building at the cathode during the electrolysis to form doped, rather than intrinsic, carbon nanomaterials, with specific, desired, different chemical physical properties, and the electrolysis is conducted directly without the need to induce doping as a post treatment. The facile high yield, low energy, synthesis of doped and diverse morphology (but uniform as synthesized using specified pathways) carbon nanomaterials may be accomplished by the above processes. These carbon nanomaterials have high conductivity, high strength, high electrical storage, high blast resistance, catalyst specific functionality and pollutant sorbant capabilities. The molten carbonate electrolysis synthesis removes both atmospheric and/or anthropogenic carbon dioxide from the environment. The substantial effect of the electrolysis configuration and conditions is demonstrated both on carbon morphology, doping, Raman spectroscopy and SEM, and on carbon nanotube conductivity. The activation effect equivalent to that of galvanized (zinc plating) is accomplished without a zinc coating. This opens the pathway to study a wide variety of alternative non-coated cathode electrodes. This doping is accomplished directly by the addition of dopant containing, and control of morphology is accomplished by several techniques which include the exclusion of nucleating agents to the electrolysis.

The carbon nanomaterials may be made very electrically conductive, round, solid or hollow, or flat or thin or thick walled, or long or short, and with a variety of chemical physical properties. This expanded portfolio of inexpensive to synthesize molten carbonate electrolysis product carbon materials is suitable to similar applications use by other materials for example in metals, combining, braiding or weaving into wire, cables, wires or cloths, textiles, batteries, catalysts optical devices, packaging materials, lower-weight, fracture and blast-resistant construction and ceramic materials, and electronics.

In one embodiment, the carbon nanomaterial doping component includes at least one material with a group 1 element, or at least one material with a group 2 element, or at least one material with a non-carbon group 4 element, or at least one material with a group 5 element, or at least one material with a group 6 chalcogenide element, or at least one material with gold, platinum, iridium, iron or other row 4, 5, or 6 metals.

The terminology used herein is for the purpose of describing particular embodiments only, and is not intended to be limiting of the invention. As used herein, the singular forms "a," "an" and "the" are intended to include the plural forms as well, unless the context clearly indicates otherwise. Furthermore, to the extent that the terms "including", "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for producing a doped carbon nanomaterial comprising:

heating a carbonate electrolyte to obtain a molten carbonate electrolyte;

disposing the molten carbonate electrolyte between an anode and a cathode in a cell;

including a carbon nanomaterial doping component in the cell;

applying an electrical current to the cathode and the anode in the cell; and collecting the doped carbon nanomaterial growth from the cathode of the cell;

wherein the carbon nanomaterial doping component includes at least one material with a group IIIA element, a non-carbon group IVA element, a group VA element, a group VIA chalcogenide element, or at least one material with gold, platinum, iridium, iron or other row 4, 5, or 6 metals, wherein the carbon nanomaterial doping component does not include boron, wherein atoms of the nanomaterial doping component introduced during the molten carbonate electrolysis are directly incorporated into the carbon nanomaterial building at the cathode during electrolysis to form the doped carbon nanomaterial, and wherein the doped carbon nanomaterial is graphitic and has desired chemical physical properties that are different from a dopant-free carbon nanomaterial, and wherein the desired chemical physical properties are a catalytic property of: a heterogeneous catalytic property, a homogeneous catalytic property, a fuel cell catalytic property, an aerobic oxidation catalytic property, an enhanced reaction activity property and any combination thereof.

2. The method of claim 1, wherein the nanomaterial doping component is free of transition metal, the method further comprising application of an alternating electrical current to the molten carbonate electrolyte.

3. The method of claim 2, wherein the electrical current is selected for doped carbon nano-onion product growth.

4. The method of claim 1, further comprising adding ZnO to the molten carbonate electrolyte, and wherein the electrical current is selected for doped graphene platelet product growth.

5. The method of claim 1, further comprising adding MgO to the molten carbonate electrolyte and wherein the electrolysis current is selected for doped hollow carbon nanosphere product growth.

6. The method of claim 1, further comprising the step of including a nanomaterial selection component in the cell, wherein the nanomaterial selection component disperses a transition metal and wherein the nanomaterial selection component is selected for doped carbon nanotube product growth.

7. The method of claim 1, wherein the carbon nanomaterial doping component includes at least one of a solid electrolyte additive, a liquid electrolyte additive, a gas electrolyte additive, a cathode material, or an anode material.

8. The method of claim 7 wherein the carbon nanomaterial doping component is a solid salt, an element, or a covalent compound, wherein the doping component is dissolved, reacted or suspended in the electrolyte.

9. The method of claim 1, wherein the carbon nanomaterial doping component contains includes at least one material with a group 3 element.

10. The method of claim 1, wherein the carbon nanomaterial doping component contains a species with oxygen atoms or halide atoms, or comprises one or more of nitrate, phosphate, thiophosphate, silicate, borate, thionyl chloride, sulfur chloride, silicon chloride, thiophosphate, thionyl nitrate, silicon nitrates, silicon nitrites, sulfur oxide and nitrous oxide gas.

11. The method of claim 1, wherein the carbon nanomaterial doping component includes more than one doping element.

12. The method of claim 1 wherein said cathode or anode comprises at least one material or alloy selected from the group consisting of: nickel; copper; chromium;

iron; manganese; titanium; zinc, zirconium; molybdenum; tantalum; platinum, iridium cobalt;

silicon; and carbon pure metal.

13. The method of claim 1 wherein said carbon nanomaterial doping component comprises a coating on the cathode or the anode.

14. The method of claim 1 wherein the carbon nanomaterial carbon nanomaterial is a doped carbon nanotube.

15. The method of claim 1 wherein the carbon nanomaterial is doped graphene.

16. The method of claim 1 wherein the carbon nanomaterial is a doped carbon nano-onion.

17. The method of claim 1 wherein the carbon nanomaterial is a doped hollow carbon nano-sphere.

18. The method of claim 1, wherein the carbon nanomaterial doping component is sulfur.

19. The method of claim 1, wherein the carbon nanomaterial doping component is nitrogen.

20. The method of claim 1, wherein the carbon nanomaterial doping component is phosphorus.

21. The method of claim 1, wherein the carbon nanomaterial doping component is free of a transition metal.

* * * * *